(12) United States Patent
Zhou

(10) Patent No.: US 11,714,456 B2
(45) Date of Patent: Aug. 1, 2023

(54) FOLDABLE DISPLAY MODULE

(71) Applicant: WUHAN CHINA STAR OPTOELECTRONICS SEMICONDUCTOR DISPLAY TECHNOLOGY CO., LTD., Wuhan (CN)

(72) Inventor: Qiyuan Zhou, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 256 days.

(21) Appl. No.: 17/265,085

(22) PCT Filed: Nov. 17, 2020

(86) PCT No.: PCT/CN2020/129305
§ 371 (c)(1),
(2) Date: Feb. 1, 2021

(87) PCT Pub. No.: WO2022/077689
PCT Pub. Date: Apr. 21, 2022

(65) Prior Publication Data
US 2022/0155822 A1    May 19, 2022

(30) Foreign Application Priority Data
Oct. 13, 2020 (CN) .......................... 202011088855.6

(51) Int. Cl.
*G06F 1/16* (2006.01)
*B32B 7/12* (2006.01)
(Continued)

(52) U.S. Cl.
CPC .............. *G06F 1/1652* (2013.01); *B32B 7/12* (2013.01); *B32B 15/04* (2013.01); *B32B 27/06* (2013.01);
(Continued)

(58) Field of Classification Search
CPC ............ B32B 3/26; B32B 3/30; G06F 1/1652
See application file for complete search history.

(56) References Cited

U.S. PATENT DOCUMENTS 9,130,192 B2   9/2015   Kim et al.
10,732,674 B2   8/2020   Lee et al.
(Continued)

FOREIGN PATENT DOCUMENTS

CN    206594962 U    10/2017
CN    108597378 A    9/2018
(Continued)

OTHER PUBLICATIONS

Cambridge Materials Data Book, 2003, Cambridge University Engineering Department (Year: 2003).*

*Primary Examiner* — Zachary M Davis
(74) *Attorney, Agent, or Firm* — The Roy Gross Law Firm, LLC; Roy Gross

(57) ABSTRACT

A foldable display module is provided. The foldable display module includes a folded region and non-folded regions located on two sides of the folded region, and a flexible display panel and a flexible support layer disposed on a rear portion of the flexible display panel. A thickness of the flexible support layer ranges from 150 micrometers to 1000 micrometers, and a thickness of the flexible support layer corresponding to the folded region is less than a thickness of the flexible support layer corresponding to the non-folded regions. The present invention effectively reduces material and manufacturing costs of current foldable devices by (Continued)

thinning a portion of the flexible support layer corresponding to the folded region.

16 Claims, 4 Drawing Sheets

(51) Int. Cl.
    *B32B 15/04*     (2006.01)
    *B32B 27/06*     (2006.01)
    *B32B 27/28*     (2006.01)
    *B32B 27/34*     (2006.01)

(52) U.S. Cl.
    CPC .......... *B32B 27/281* (2013.01); *B32B 27/285* (2013.01); *B32B 27/34* (2013.01); *B32B 2307/536* (2013.01); *B32B 2307/732* (2013.01); *B32B 2457/208* (2013.01)

(56) References Cited

U.S. PATENT DOCUMENTS

| | | |
|---|---|---|
| 2013/0169515 A1 | 7/2013 | Prushinskiy et al. |
| 2017/0357289 A1 | 12/2017 | Ahn |
| 2019/0204872 A1* | 7/2019 | Lee ........................ G06F 1/1652 |
| 2019/0213924 A1 | 7/2019 | Ha et al. |
| 2020/0251025 A1* | 8/2020 | Li ........................ H01L 51/5237 |
| 2020/0266367 A1 | 8/2020 | Wang et al. |
| 2021/0174710 A1 | 6/2021 | He |

FOREIGN PATENT DOCUMENTS

| | | |
|---|---|---|
| CN | 109545087 A | 3/2019 |
| CN | 109616018 A | 4/2019 |
| CN | 110277022 A | 9/2019 |
| CN | 110570764 A | 12/2019 |
| CN | 110649058 A | 1/2020 |
| CN | 110751908 A | 2/2020 |
| CN | 110752232 A | 2/2020 |
| CN | 110827684 A | 2/2020 |
| CN | 110828516 A | 2/2020 |
| CN | 110853525 A | 2/2020 |
| CN | 111063258 A | 4/2020 |
| CN | 111081899 A | 4/2020 |
| CN | 111739423 A | 10/2020 |
| KR | 20190085208 A | 7/2019 |

\* cited by examiner

FOLDABLE DISPLAY MODULE

CROSS REFERENCE TO RELATED APPLICATIONS

This application is a National Phase of PCT Patent Application No. PCT/CN2020/129305 having International filing date of Nov. 17, 2020, which claims the benefit of priority of Chinese Application No. 202011088855.6 filed Oct. 13, 2020. The contents of the above applications are all incorporated by reference as if fully set forth herein in their entirety.

FIELD OF INVENTION

The present invention relates to the field of display technologies, and in particular, to a foldable display module.

BACKGROUND OF INVENTION

Organic light emitting diodes (OLEDs, organic electroluminescence display) have become one of hotspots in the field of flexible display research due to their excellent performance such as fast response time, wide viewing angles, high brightness, low power consumption, and bending resistance. At present, due to materials and technical bottlenecks, small radius dynamic folding flexible displays have problems such as peeling, scratches, wrinkles, poor ball and pen dropping performance, etc. All major panel manufacturers are trying to resolve these problems by optimizing display panel stacking designs. A main improvement method is to add backplates, foams, metal sheets, and other functional layers on non-display surfaces of panels. As shown in FIG. 1, a dynamic folding flexible display adds three functional layer materials with a total thickness of 350 um to non-display surfaces of a display panel 1: a backplane 2 (50 um), a foam 3 (150 um), and a metal support layer 4 (150 um) to provide support, cushioning, and improved bending strength to the display panel 1. Although the method can effectively improve performance of the display panel, the use of functional membrane materials and adhesive materials (such as PSA, OCA) for bonding functional membrane materials has been greatly increased, which greatly increases manufacturing processes of dynamic folding display screens, and manufacturing costs remain high.

Therefore, current technologies have shortcomings and needs to be solved urgently.

Technical Problem

The present invention provides a foldable display module, which can solve problems of high material and manufacturing costs of current foldable devices.

Technical Solution

In order to solve the above problems, technical solutions provided by the present invention are as follows:

The present invention provides a foldable display module comprising:

a folded region and non-folded regions located on two sides of the folded region; and a flexible display panel and a flexible support layer disposed on a rear portion of the flexible display panel;

wherein a thickness of the flexible support layer ranges from 150 micrometers to 1000 micrometers, and a thickness of the flexible support layer corresponding to the folded region is less than a thickness of the flexible support layer corresponding to the non-folded regions.

In the foldable display module of the present invention, a hardness of the flexible support layer ranges from 1.5H to 8H.

In the foldable display module of the present invention, the hardness of the flexible support layer ranges from 3H to 6H.

In the foldable display module of the present invention, a Young's modulus of the flexible support layer is greater than or equal to 3 GPa.

In the foldable display module of the present invention, the thickness of the flexible support layer corresponding to the folded region is less than 100 micrometers and greater than 2 micrometers.

In the foldable display module of the present invention, a material of the flexible support layer comprises at least one of polyimide, polyetheretherketone, polyterephthalic acid, or polyamide, or the material of the flexible support layer is metal.

In the foldable display module of the present invention, the thickness of the flexible support layer corresponding to the folded region decreases from a middle portion of the folded region to the two sides of the folded region.

In the foldable display module of the present invention, a portion of the flexible support layer corresponding to the folded region comprises a first inclined surface and a second inclined surface symmetrically disposed along a center line of the folded region, and the first inclined surface and the second inclined surface intersect at a position of the center line of the folded region.

In the foldable display module of the present invention, a portion of the flexible support layer corresponding to the folded region comprises a first arc surface and a second arc surface symmetrically disposed along a center line of the folded region, and the first arc surface and the second arc surface intersect at a position of the center line of the folded region.

In the foldable display module of the present invention, a side of the flexible support layer facing away from the flexible display panel is provided with a heat dissipation layer, and the heat dissipation layer is disposed corresponding to the non-folded regions.

In order to solve the above problems, the present invention further provides a foldable display module comprising:

a folded region and non-folded regions located on two sides of the folded region; and a flexible display panel and a flexible support layer disposed on a rear portion of the flexible display panel;

wherein the foldable display module further comprises a touch panel disposed on a side of the flexible display panel away from the flexible support layer; and wherein a thickness of the flexible support layer ranges from 150 micrometers to 1000 micrometers, and a thickness of the flexible support layer corresponding to the folded region is less than a thickness of the flexible support layer corresponding to the non-folded regions.

In the foldable display module of the present invention, a hardness of the flexible support layer ranges from 1.5H to 8H.

In the foldable display module of the present invention, the hardness of the flexible support layer ranges from 3H to 6H.

In the foldable display module of the present invention, a Young's modulus of the flexible support layer is greater than or equal to 3 GPa.

In the foldable display module of the present invention, the thickness of the flexible support layer corresponding to the folded region is less than 100 micrometers and greater than 2 micrometers.

In the foldable display module of the present invention, a material of the flexible support layer comprises at least one of polyimide, polyetheretherketone, polyterephthalic acid, or polyamide, or the material of the flexible support layer is metal.

In the foldable display module of the present invention, the thickness of the flexible support layer corresponding to the folded region decreases from a middle portion of the folded region to the two sides of the folded region.

In the foldable display module of the present invention, a portion of the flexible support layer corresponding to the folded region comprises a first inclined surface and a second inclined surface symmetrically disposed along a center line of the folded region, and the first inclined surface and the second inclined surface intersect at a position of the center line of the folded region.

In the foldable display module of the present invention, a portion of the flexible support layer corresponding to the folded region comprises a first arc surface and a second arc surface symmetrically disposed along a center line of the folded region, and the first arc surface and the second arc surface intersect at a position of the center line of the folded region.

In the foldable display module of the present invention, a side of the flexible support layer facing away from the flexible display panel is provided with a heat dissipation layer, and the heat dissipation layer is disposed corresponding to the non-folded regions.

Beneficial Effect

Beneficial effects of the present invention are: a foldable display module provided by the present invention is provided with a flexible support layer with a thickness ranging from 150 micrometers to 1000 micrometers on a rear portion of a flexible display panel, and a thickness of the flexible support layer corresponding to a folded region is less than a thickness of the flexible support layer corresponding to non-folded regions. The present invention replaces a mainstream backplane-foam-metal support layer stacking design on a current foldable device by using a single film layer (i.e. a flexible support layer) that is thinned in the folded region, therefore, without affecting bending performance of the foldable display module, material and manufacturing costs of the current foldable device can be effectively reduced.

DESCRIPTION OF DRAWINGS

Technical solutions and other beneficial effects of the present invention will be made apparent by the following detailed description of the manner in which the present invention is to be implemented, in conjunction with the accompanying drawings.

DETAILED DESCRIPTION OF PREFERRED EMBODIMENTS

Figure 1:
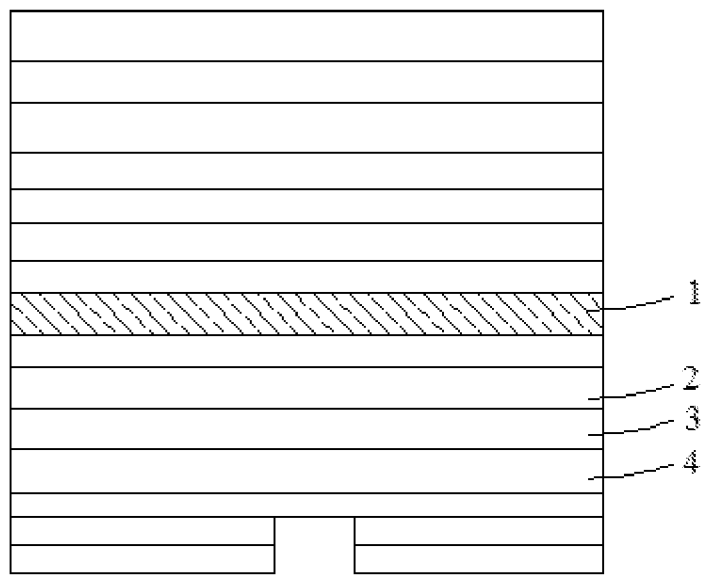
FIG. 1 is a schematic structural view of a current dynamic folding flexible display.

The following will clearly and completely describe the technical solutions in the embodiments of the present invention with reference to the drawings in the embodiments of the present invention. Obviously, the described embodiments are only a part of the embodiments of the present invention, rather than all the embodiments. Based on the embodiments in the present invention, all other embodiments obtained by those skilled in the art without creative work are within the protection scope of the present invention.

In the description of the present invention, it is to be understood that the terms "longitudinal," "lateral," "length," "width," "thickness," "upper," "lower," "front," "rear," "left," "right," "vertical," "horizontal," and the like are used in the orientations and positional relationships indicated in the drawings for convenience in describing the present invention and for simplicity in description, and are not intended to indicate or imply that the referenced devices or elements must have a particular orientation, be constructed in a particular orientation, and be operated in a particular manner, and are not to be construed as limiting the present invention. Furthermore, the terms "first" and "second" are used for descriptive purposes only and are not to be construed as indicating or implying relative importance or implicitly indicating the number of technical features indicated. Thus, features defined as "first", "second", may explicitly or implicitly include one or more of the described features. In the description of the present application, "plurality" means two or more unless specifically limited otherwise.

The present invention may repeat reference numerals and/or reference letters in different examples. The repetition is for the purpose of simplification and clarity, and does not indicate the relationship between the various embodiments and/or settings discussed.

Figure 2:
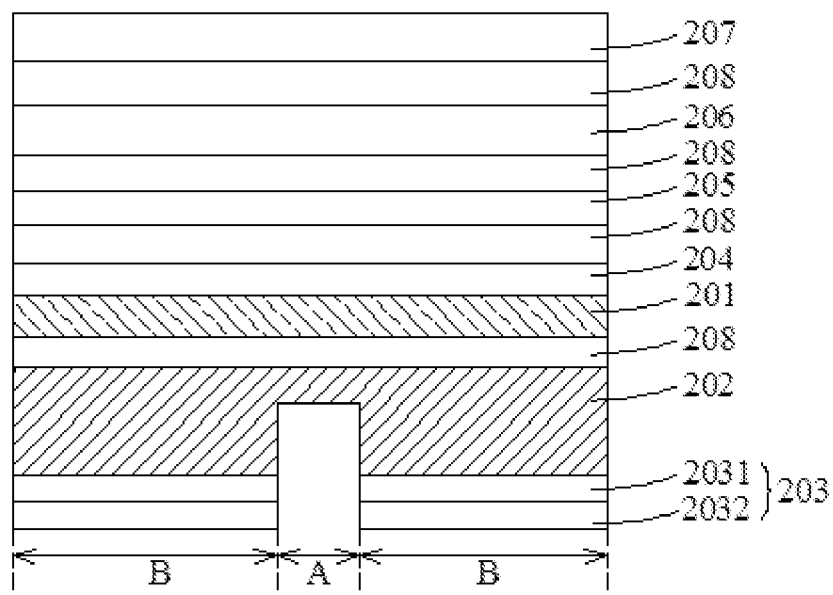
FIG. 2 is a schematic structural view of a foldable display module provided in a first embodiment of the present invention.
Figure 4:
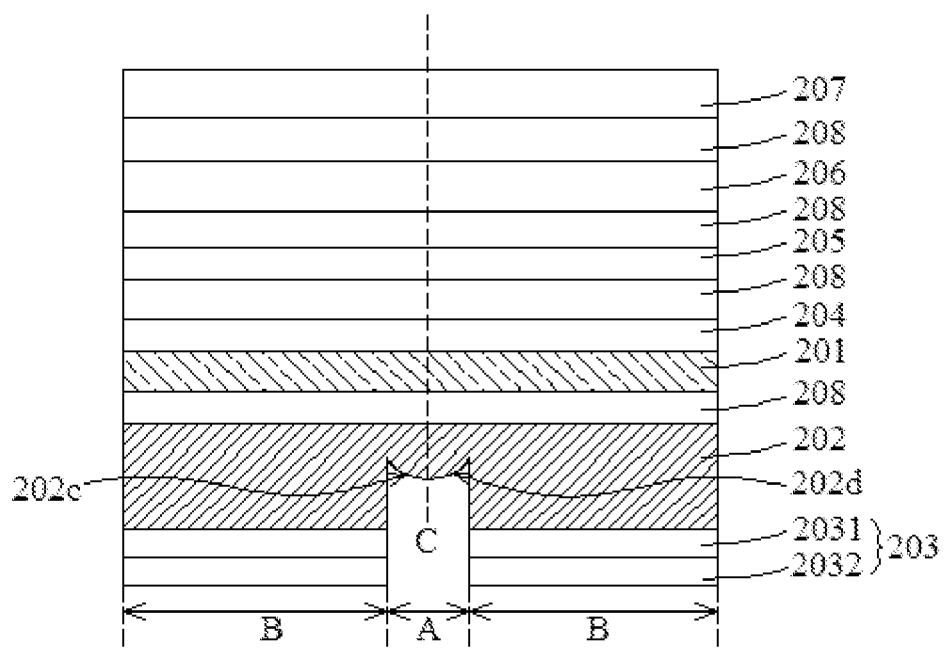
FIG. 4 is a schematic structural view of the foldable display module provided in a third embodiment of the present invention.

As shown in FIG. 2 and FIG. 4, a foldable display module of the present invention comprises a folded region A and non-folded regions B located on two sides of the folded region A. The foldable display module comprises a flexible display panel 201 and a flexible support layer 202 disposed on a rear portion of the flexible display panel 201. The flexible support layer 202 is configured to provide support and cushioning for the flexible display panel 201, and can improve bending strength of the foldable display module.

The flexible display panel 201 may be an organic electroluminescence display panel, a liquid crystal display panel, or a quantum dot display panel.

Wherein, a thickness of the flexible support layer 202 of the present invention ranges from 150 micrometers to 1000 micrometers, for example, it can be 300 micrometers, 500 micrometers, 700 micrometers, 900 micrometers, etc. The flexible support layer 202 in this thickness range can provide sufficient supporting force for the flexible display panel 201, and can make the flexible display panel 201 in a flat state when the foldable display module is unfolded. Meanwhile, a thickness of the flexible support layer 202 corresponding to the folded region A is less than a thickness of the flexible support layer 202 corresponding to the non-folded regions B. Since a portion of the flexible support layer 202 corresponding to the folded region A is thinned, the flexible support layer 202 has good bending performance in the folded region A.

The present invention uses the flexible support layer 202 with a single film structure to replace a mainstream backplane-foam-metal support layer stacking design on current foldable device. Since the backplane-foam-metal support layer in the current foldable device further needs to be bonded by an adhesive layer, the present invention not only reduces the use of functional materials and multilayer adhesive layers, but also reduces at least three bonding processes, which can effectively reduce material and manufacturing costs of the current foldable device.

The foldable display module of the present invention will be described in detail below in conjunction with specific embodiments.

First Embodiment

Shown in FIG. 2 is a schematic structural view of the foldable display module provided in the first embodiment of the present invention. The foldable display module comprises the flexible display panel 201. A front surface of the flexible display panel 201 is a display surface, and the rear portion of the flexible display panel 201 is a non-display surface. A side of the non-display surface of the flexible display panel 201 is stacked with the flexible support layer 202 and a heat dissipation layer 203 from top to bottom. A side of the display surface of the flexible display panel 201 is stacked with a touch panel 204, a polarizer 205, a flexible cover 206, and a protective film 207 from bottom to top. In addition, two adjacent film layers are bonded to each other through an adhesive layer 208.

In the embodiment, the thickness of the flexible support layer 202 may be 300 micrometers. Specifically, the thickness of the flexible support layer 202 corresponding to the non-folded regions B is 300 micrometers, and the thickness of the flexible support layer 202 corresponding to the folded region A is less than 100 micrometers.

However, in order to ensure that the flexible support layer 202 of the folded region A can provide a certain supporting force for the foldable display module, prevent the foldable display module from being depressed or uneven in a portion corresponding to the folded region A after the foldable display module is unfolded, and prevent feeling of "space" at a position corresponding to the folded region A when the foldable display module is touched, preferably, the thickness of the flexible support layer 202 corresponding to the folded region A is less than 100 micrometers and greater than 2 micrometers.

Further, the thickness of the flexible support layer 202 corresponding to the folded region A is 50 micrometers. After the flexible support layer 202 is thinned in the folded region A, the bending strength of the foldable display module can be effectively improved.

In the embodiment, a hardness of the flexible support layer 202 ranges from 1.5H to 8H, which can provide good support performance. When the hardness of the flexible support layer 202 is smaller, its thickness is greater; when the hardness of the flexible support layer 202 is greater, its thickness is smaller.

Further, the hardness of the flexible support layer 202 ranges from 3H to 6H. For example, the hardness of the flexible support layer 202 may be 3H, 4H, 4.5H, 5H, 6H, etc.

In an embodiment, when the hardness of the flexible support layer 202 ranges from 3H to 4.5H, the thickness of the flexible support layer 202 may range from 600 micrometers to 1000 micrometers. When the hardness of the flexible support layer 202 ranges from 4.5H to 6H, the thickness of the flexible support layer 202 may range from 150 micrometers to 600 micrometers.

It is understandable that when the hardness of the flexible support layer 202 is smaller, the thickness of the flexible support layer 202 in the corresponding folded region A is also greater. When the hardness of the flexible support layer 202 is greater, the thickness of the flexible support layer 202 of the corresponding folded region A is smaller. By appropriately adjusting the thickness of the flexible support layer 202 through the hardness of the flexible support layer 202, the flexible support layer 202 can have excellent supporting performance and excellent bending performance at a same time.

In the embodiment, a Young's modulus of the flexible support layer 202 is greater than or equal to 3 GPa. For example, it can be 4 GPa, 5 GPa, 6 GPa, 7 GPa, etc. Therefore, the flexible support layer 202 has good bending strength, improves the bending performance of the foldable display module, and prevents risk of cracks, wrinkles, and film peeling of the foldable display module during repeated bending. Meanwhile, the flexible support layer 202 of the embodiment has better impact resistance. For example, when the Young's modulus of the flexible support layer 202 ranges from 3 GPa to 7 GPa, an impact resistance can be improved, thereby improving ball and pen dropping performance.

In the foldable display module, when an external instantaneous local impact force acts on the foldable display module and is transmitted to the flexible support layer 202, the impact force is absorbed by the flexible support layer 202 and converted into deformation energy, which prevents the impact force from continuing to spread to a side of the flexible display panel 201, and improves an impact resistance of the foldable display module.

A material of the flexible support layer 202 comprises at least one of polyimide, polyetheretherketone, polyterephthalic acid, or polyamide, or the material of the flexible support layer 202 is metal.

The foldable display module of the embodiment integrates displays and touches. Of course, in other embodiments, the foldable display module may not comprise the touch panel 204.

Since the flexible display panel 201 generates a large amount of heat during use, if the generated heat cannot be discharged in time, display performance of the flexible display panel 201 will be affected. Therefore, the heat dissipation layer 203 is provided on a side of the flexible support layer 202 facing away from the flexible display panel 201. In order not to affect the bending performance of the foldable display module, the heat dissipation layer 203 is provided corresponding to the non-folded regions B, and the folded region A is not provided with the heat dissipation layer 203.

The heat dissipation layer 203 comprises a first heat dissipation layer 2031 and a second heat dissipation layer 2032 that are stacked with each other. A material of the first heat dissipation layer 2031 may be metal, such as copper, which is favorable for heat conduction. A material of the second heat dissipation layer 2032 may be metal or non-metal. A thickness of the heat dissipation layer 203 ranges from 80 μm to 100 μm, and a thickness of the first heat dissipation layer 2031 may be 50 μm.

In the embodiment, a thickness of the touch panel 204 may be 3 micrometers, a thickness of the polarizer 205 may be 28 micrometers, a thickness of the flexible cover 206 may range from 10 micrometers to 40 micrometers, and a thickness of the protective film 207 may be 50 micrometers. A thickness of the adhesive layer 208 between the flexible display panel 201 and the flexible support layer 202 may be 25 micrometers, a thickness of the adhesive layer 208 between the touch panel 204 and the polarizer 205 may be 40 micrometers, a thickness of the adhesive layer 208 between the polarizer 205 and the flexible cover 206 may be 50 micrometers, and a thickness of the adhesive layer 208 between the flexible cover 206 and the protective film 207 may be 25 micrometers.

In the embodiment, the flexible support layer 202 that has been thinned in the folded region is configured to replace the backplane-foam-metal support layer stacking design on the current foldable device. Since the present invention reduces the functional film layer while thinning the folded region, it is more conducive to the bending of the foldable display module. It can solve problems of the current foldable device due to excessive functional film layers, resulting in excessive bending radius, easy peeling of the film layer, wrinkles, poor ball and pen dropping performance, etc.

Second Embodiment

Figure 3:
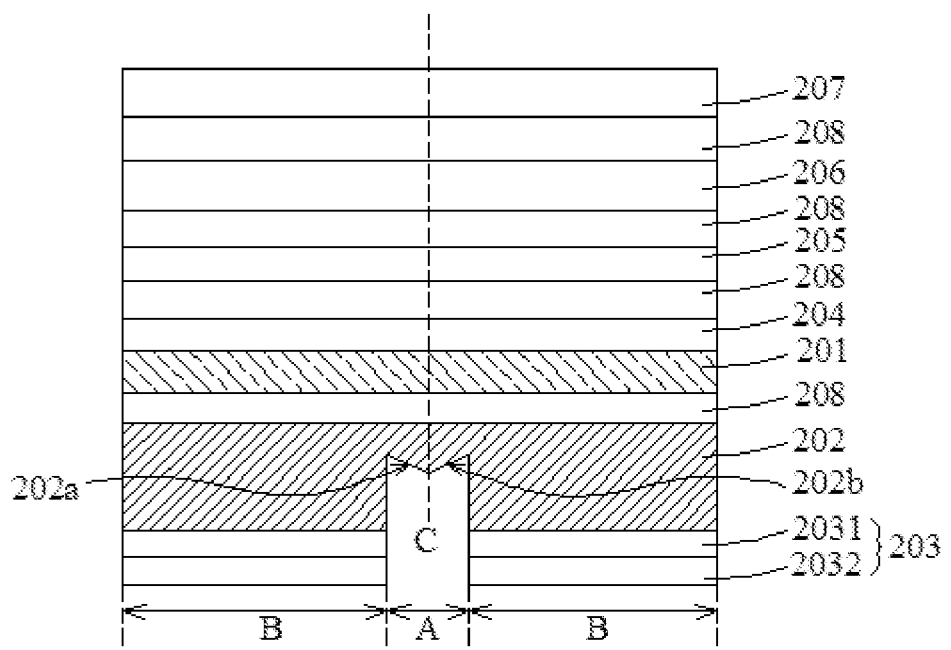
FIG. 3 is a schematic structural view of the foldable display module provided in a second embodiment of the present invention.

Shown in FIG. 3 is a schematic structural view of the foldable display module provided in the second embodiment of the present invention. A structure of the foldable display module of the embodiment is the same as/similar to a structure of the foldable display module of the first embodiment, and a difference is: in the embodiment, a method of thinning the flexible support layer 202 in the folded region A is beneficial to a graphic thinning of the folding, that is, the flexible support layer 202 in the folded region A is set with non-uniform thickness. In addition, the thickness of the flexible support layer 202 corresponding to the folded region A decreases from a middle portion of the folded region A to two sides of the folded region A.

Specifically, a folding method of the foldable display module is an inward folding type. A portion of the flexible support layer 202 corresponding to the folded region A and the rest are continuous film layers. The portion of the flexible support layer 202 corresponding to the folded region A comprises a first inclined surface 202a and a second inclined surface 202b. The first inclined surface 202a and the second inclined surface 202b are symmetrically disposed along a center line C of the folded region A, and the first inclined surface 202a and the second inclined surface 202b intersect at a position of the center line C of the folded region A.

The thickness of the flexible support layer 202 corresponding to the folded region A gradually decreases from the middle portion of the folded region A to the two sides of the folded region A. A thickness of a thinnest portion of the flexible support layer 202 is greater than 2 mm, for example, it may be 10 mm to 20 mm.

The foldable display module in the embodiment is compared with the foldable display module in the first embodiment. Since an outer surface of the flexible support layer 202 of the folded region A is designed as two symmetrical inclined surfaces facing a folding direction in the embodiment, bending stress of the foldable display module can be reduced, which is more beneficial to the bending of the foldable display module.

Third Embodiment

Shown in FIG. 4 is a schematic structural view of the foldable display module provided in the third embodiment of the present invention. A structure of the foldable display module of the embodiment is the same as/similar to the structure of the foldable display module of the first embodiment, and a difference is: in the embodiment, a method of thinning the flexible support layer 202 in the folded region A is beneficial to the graphic thinning of the folding, that is, the thickness of the flexible support layer 202 corresponding to the folded region A decreases from the middle portion of the folded region A to the two sides of the folded region A.

Specifically, the portion of the flexible support layer 202 corresponding to the folded region A and the rest are continuous film layers. The portion of the flexible support layer 202 corresponding to the folded region A comprises a first arc surface 202c and a second arc surface 202d. The first arc surface 202c and the second arc surface 202d are symmetrically disposed along the center line C of the folded region A, and the first arc surface 202c and the second arc surface 202d intersect at the position of the center line C of the folded region A.

The first arc surface 202c and the second arc surface 202d may be two portions of a same arc surface divided along the center line C.

The foldable display module in the embodiment is compared with the foldable display module in the first embodiment. Since the outer surface of the flexible support layer 202 of the folded region A is designed as an arc surface that is bent toward the folding direction in the embodiment, the bending stress of the foldable display module can be reduced, which is more beneficial to the bending of the foldable display module.

In other embodiments, a cross-sectional shape of the outer surface of the flexible support layer 202 of the folded region A may also be wavy, zigzag, etc., which is not limited here.

The present invention uses the flexible support layer 202 to replace the three-layer structure of the backplane-foam-metal support layer on the current foldable device, which can reduce the number of film layers and the use of materials of the foldable display module, thereby saving costs, and solving the problems of excessive bending radius, easy peeling, wrinkles, etc. of the current foldable device due to excessive functional film layers. In addition, by optimizing a design of the structure of the flexible support layer 202, the bending performance of the foldable display module can be improved, and problems such as poor ball and pen dropping performance can be solved.

In the above, although the present invention has been disclosed as above in preferred embodiments, the above preferred embodiments are not intended to limit the present invention. Those of ordinary skill in the art can make various changes and modifications without departing from the spirit and scope of the present invention. Therefore, protection scopes of the present invention are subject to the scope defined by the claims.

What is claimed is:

1. A foldable display module, comprising:
a folded region and non-folded regions located on two sides of the folded region; and
a flexible display panel and a flexible support layer disposed on a rear portion of the flexible display panel;
wherein a thickness of the flexible support layer ranges from 150 micrometers to 1000 micrometers, and a thickness of the flexible support layer corresponding to the folded region is less than a thickness of the flexible support layer corresponding to the non-folded regions; and
wherein a hardness of the flexible support layer ranges from 1.5H to 8H.

2. The foldable display module as claimed in claim 1, wherein the hardness of the flexible support layer ranges from 3H to 6H.

3. The foldable display module as claimed in claim 1, wherein a Young's modulus of the flexible support layer is greater than or equal to 3 GPa.

4. The foldable display module as claimed in claim 1, wherein a material of the flexible support layer comprises at least one of polyimide, polyetheretherketone, polyterephthalic acid, or polyamide, or the material of the flexible support layer is metal.

5. The foldable display module as claimed in claim 1, wherein the thickness of the flexible support layer corresponding to the folded region decreases from a middle portion of the folded region to the two sides of the folded region.

6. The foldable display module as claimed in claim 5, wherein a portion of the flexible support layer corresponding to the folded region comprises a first inclined surface and a second inclined surface symmetrically disposed along a center line of the folded region, and the first inclined surface and the second inclined surface intersect at a position of the center line of the folded region.

7. The foldable display module as claimed in claim 5, wherein a portion of the flexible support layer corresponding to the folded region comprises a first arc surface and a second arc surface symmetrically disposed along a center line of the folded region, and the first arc surface and the second arc surface intersect at a position of the center line of the folded region.

8. The foldable display module as claimed in claim 1, wherein a side of the flexible support layer facing away from the flexible display panel is provided with a heat dissipation layer, and the heat dissipation layer is disposed corresponding to the non-folded regions.

9. A foldable display module, comprising:
   a folded region and non-folded regions located on two sides of the folded region; and
   a flexible display panel and a flexible support layer disposed on a rear portion of the flexible display panel;
   wherein the foldable display module further comprises a touch panel disposed on a side of the flexible display panel away from the flexible support layer;
   wherein a thickness of the flexible support layer ranges from 150 micrometers to 1000 micrometers, and a thickness of the flexible support layer corresponding to the folded region is less than a thickness of the flexible support layer corresponding to the non-folded regions; and
   wherein a hardness of the flexible support layer ranges from 1.5H to 8H.

10. The foldable display module as claimed in claim 9, wherein the hardness of the flexible support layer ranges from 3H to 6H.

11. The foldable display module as claimed in claim 9, wherein a Young's modulus of the flexible support layer is greater than or equal to 3 GPa.

12. The foldable display module as claimed in claim 9, wherein a material of the flexible support layer comprises at least one of polyimide, polyetheretherketone, polyterephthalic acid, or polyamide, or the material of the flexible support layer is metal.

13. The foldable display module as claimed in claim 9, wherein the thickness of the flexible support layer corresponding to the folded region decreases from a middle portion of the folded region to the two sides of the folded region.

14. The foldable display module as claimed in claim 13, wherein a portion of the flexible support layer corresponding to the folded region comprises a first inclined surface and a second inclined surface symmetrically disposed along a center line of the folded region, and the first inclined surface and the second inclined surface intersect at a position of the center line of the folded region.

15. The foldable display module as claimed in claim 13, wherein a portion of the flexible support layer corresponding to the folded region comprises a first arc surface and a second arc surface symmetrically disposed along a center line of the folded region, and the first arc surface and the second arc surface intersect at a position of the center line of the folded region.

16. The foldable display module as claimed in claim 9, wherein a side of the flexible support layer facing away from the flexible display panel is provided with a heat dissipation layer, and the heat dissipation layer is disposed corresponding to the non-folded regions.

* * * * *